(12) United States Patent
Niazi

(10) Patent No.: US 8,712,882 B2
(45) Date of Patent: Apr. 29, 2014

(54) PREDICTIVE TIME ENTRY FOR WORKFORCE MANAGEMENT SYSTEMS

(75) Inventor: Uzair Ahmed Niazi, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 738 days.

(21) Appl. No.: 12/640,799

(22) Filed: Dec. 17, 2009

(65) Prior Publication Data

US 2011/0153477 A1 Jun. 23, 2011

(51) Int. Cl.
*G07C 1/10* (2006.01)

(52) U.S. Cl.
USPC .............................................. 705/32; 705/320

(58) Field of Classification Search
USPC ....................................................... 705/32, 8
See application file for complete search history.

(56) References Cited

U.S. PATENT DOCUMENTS

| | | | | |
|---|---|---|---|---|
| 6,167,405 | A * | 12/2000 | Rosensteel et al. ................. | 1/1 |
| 6,289,317 | B1 * | 9/2001 | Peterson ..................... | 705/7.37 |
| 6,415,284 | B1 * | 7/2002 | D'Souza et al. ..................... | 1/1 |
| 6,832,176 | B2 * | 12/2004 | Hartigan et al. ............... | 702/178 |
| 2002/0069145 | A1 * | 6/2002 | Collado et al. ................... | 705/32 |
| 2003/0055755 | A1 * | 3/2003 | Shuder et al. .................... | 705/32 |
| 2004/0153335 | A1 * | 8/2004 | O'Keeffe .......................... | 705/1 |
| 2005/0080649 | A1 * | 4/2005 | Alvarez et al. ..................... | 705/1 |
| 2006/0010051 | A1 * | 1/2006 | Sattler et al. ..................... | 705/32 |
| 2006/0047548 | A1 * | 3/2006 | Ulmer et al. ....................... | 705/8 |
| 2006/0095315 | A1 * | 5/2006 | Ano et al. ......................... | 705/11 |
| 2007/0094109 | A1 * | 4/2007 | Perry ............................... | 705/32 |
| 2007/0124278 | A1 * | 5/2007 | Lewis et al. ........................ | 707/2 |
| 2007/0282722 | A1 * | 12/2007 | Ducolon et al. ................. | 705/32 |
| 2009/0228312 | A1 * | 9/2009 | Cazares et al. ..................... | 705/7 |
| 2010/0042518 | A1 * | 2/2010 | Handa et al. ..................... | 705/30 |

* cited by examiner

*Primary Examiner* — Matthew Gart
*Assistant Examiner* — Talia Crawley
(74) *Attorney, Agent, or Firm* — Kilpatrick Townsend & Stockton LLP

(57) ABSTRACT

This disclosure describes, generally, methods and systems for predictive approaches used to auto-populate timecards for an employee/contractor. A system/framework is proposed that can auto-populate timecards for employees using predictive approaches. The predictive approaches may look at the patterns of time entry for the individual who is performing entry of the time. The system can also look at patterns of time entry for other team members within an organization or group whose time entry patterns may be similar or identical to other individuals.

21 Claims, 5 Drawing Sheets

PREDICTIVE TIME ENTRY FOR WORKFORCE MANAGEMENT SYSTEMS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to workforce management and, more particularly, to predictive time entry for workforce management systems.

BACKGROUND

Presently, many organizations require employees and contractors to capture time that they have worked on a particular task, shift, job, department, role, assignment, project, etc. (the list is not exhaustive). The employer typically processes the time worked to determine, for example, how much to pay the employee or contractor, how much to bill a customer for whom the work has been conducted, how much direct and or indirect cost should be attributed to a task, cost-center or project, etc. Whatever the reason, organizations need to receive accurate and timely capture of time information from their employees and contractors.

Current workforce management systems such as time and attendance systems and/or time and labor systems can be used to capture the time an employee has worked. The systems work by either the employee logging into the self-service workforce management system and creating entries in an online timecard themselves, or by the employee/contractor submitting a paper timecard to a timekeeper who enters the time into the workforce management system on behalf of the individual. Whichever the case may be, creating timecard entries is time-consuming and thus any improvement in efficiency to reduce the time taken for the entry of the time will result in direct productivity gains for the workforce and ultimately save the organization money.

To illustrate the costs involved and potential savings, for example, if an organization has 10,000 employees required to enter their time on a weekly basis, and each timecard takes, on average, five minutes to enter, then annually the time taken to enter the timecards for the organization is 10,000×52 weeks×5 minutes=2,600,000 minutes (or 43,333 hours). If the average wage for the employees is 10 dollars per hour that would equate to a direct cost of $433,333 dollars per year for entering in timecards. Consequently, any time that can be saved on entering the employees' time would result in a cost saving for the organization.

For example, if it were possible to cut the time to enter timecards by 50%, then in the example above that could translate to a $216,666 saving per year. Likewise, for organizations with more employees, or more complex timecards that require more time to enter, the cost savings for the organization can be much greater. Hence, aspects of the present invention have the potential to greatly decrease the time needed for time card entries and therefore, provide significant accumulative cost savings for an organization.

Some current workforce management systems introduce capabilities to help speed-up the entry of time. For example, an employee may be offered the ability to use their last timecard as a template for entering their current timecard. This is useful if the employee typically performs the same work, week in and week out, and therefore his or her timecard is similar (if not identical) from week to week. This way the employee only needs to edit the entries that are not correct or need adjustment. The objective in this approach is to not have to create all the entries from scratch, but instead to review and edit an existing timecard from a prior period, and use that as a template for a new timecard period. Reviewing and editing the timecard are much quicker to do than creating the timecard entries from scratch.

Likewise, some workforce management systems can provide the user the ability to create and save a template with pre-populated time entries. For example, a user can create a template and retrieve the template at a later date as a starting point for their current timecard. Thus, employees can create timecard templates to represent certain types of work weeks that they may regularly perform. These templates can then be used at a later date to speed up data entry for a new timecard period. The problem with these approaches is that, as the user creates new timecards, it becomes difficult to manage which timecard template contains what timecard entry information.

Furthermore, some workforce management systems can auto-populate timecard data from the work schedule that an employee is meant to work. For example, if an employee's contract states that the employee must work a 40-hour week from Monday to Friday starting at 9 am and ending at 5 pm with a one hour lunch break at 12 pm each day, then this information can be used as a starting point for auto-populating the timecard. Further, some workforce management systems can auto-populate timecard data from scheduling systems. For example, input from a project scheduling system could be used to auto-populate a timecard depending on which projects an individual is meant to be working on that week. Nonetheless, each of these current solutions to time entry workforce management has significant shortcomings, and hence, improvements in the art are needed.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
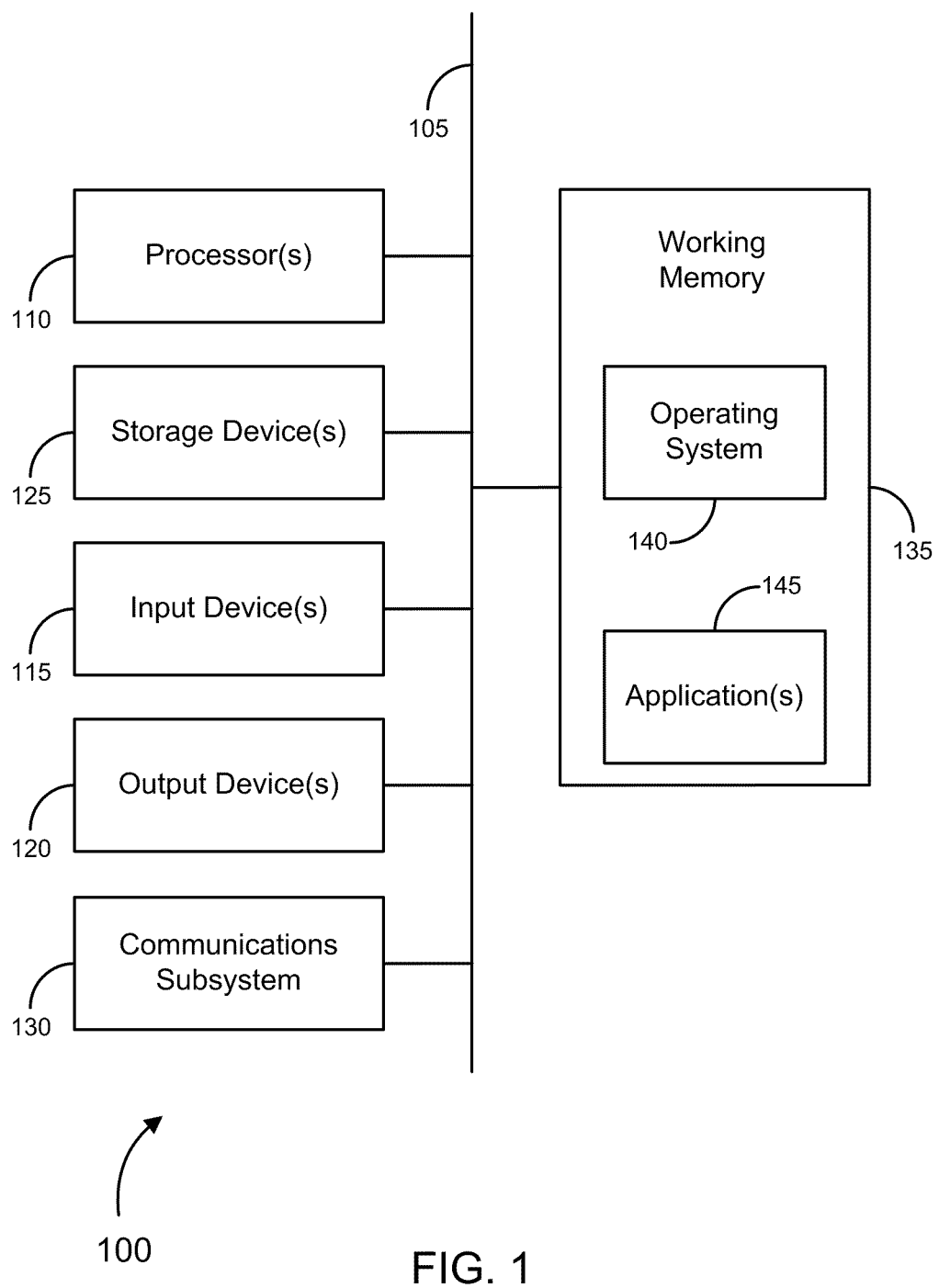
FIG. 1 is a generalized schematic diagram illustrating a computer system, in accordance with various embodiments of the present invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to predictive approaches used to auto-populate timecards for an employee/contractor. A system/framework is proposed that can auto-populate timecards for employees using predictive approaches. The predictive approaches may look at the patterns of time entry for the individual who is performing entry of the time. The system can also look at patterns of time entry for other team members within an organization or group whose time entry patterns may be similar or identical to other individuals.

For example, using a workforce management system, it is possible to identify of which organization an employee is a part, and this information is held against their employment/assignment record in the workforce management system. Using such information, one can also identify all the employees who are part of the same organization. By processing timecards entered by one employee of the same organization, the system can predict if the same timecard entry can be used as the starting point for the entry for another individual in the same organization. This may be particularly useful for organizations that perform team or group-based tasks.

For example, if a department or organizational group has 100 employees and each employee in that department creates similar timecard entries each week (but differ from week to week), because each of the employees has similar work patterns, tasks, or projects to work on, then when the first employee of that group completes a timecard for the current timecard period, any subsequent request, from a different employee within the group, to auto-populate a predictive timecard, can use that first timecard as a template for the second timecard. In this example, rather than having 100 employees create their timecard entries individually, the first timecard created by anyone in the department or group can be used as a template to accelerate entry for all others in that group for that timecard period. This is a unique feature of this system and can save significant time and cost for the organization.

The system is further able to identify timecard entries that are specific to the individual. For example, an entry of "Vacation" may only be relevant to the individual but not to any other individual for that date, time or timecard period. Likewise, an entry such as "Jury Duty" may be specific to one individual and not to others. The system may filter out, from the auto-populated timecard, categories of time entry that are specific to an individual and retain those entries that are applicable to the group. Furthermore, if a timecard entry contained, for example, "Fire Alarm Drill" or "Company Shutdown" (or other similar activities that apply to the broader organization), then that may still nonetheless appear in the auto-populated timecard template.

In the case of the first completed timecard example above, if there is a need to filter out individual specific entries, then any gaps that might result in the timecard template can be populated from analysis of the next timecard (or timecards) that is completed on the system from within the group. Alternatively, a historical template could also be used for the group to "fill" any template timecard gaps.

The quality of a predicted timecard can be measured by the system and used in future template predictions. For example, the system can attribute a numerical value as a measure of the "quality" of a predicted timecard. One such method would be to calculate as a percentage the number of entries that are changed/modified or created on the auto-populated timecard. For example, if an auto-populated timecard is generated containing forty entries and the individual for whom that timecard is generated is required to change ten entries, then the quality measure in this case may be 75% (i.e., (30/40)×100). In this case, using this measure, the higher the percentage the better the quality of the auto-generated predictive timecard. Likewise, quality measures can be used to identify any additional entries that were created and for the removal of any entries.

Further, the quality of the auto-populated template can be measured for the group as a whole. That is, the accuracy of the prediction for using a particular timecard template for the group can be measured by aggregating the quality measure for each of the individual timecards completed by the group.

In one embodiment, the measure of the quality of the timecard template can be used to select predictive timecard templates for other members of the group. For example, the first timecard completed by one employee of the group of 100 employees (as described in an earlier example above) can be used to auto-populate subsequent templates for other employees of that group. Now, when a second employee from the same organizational group attempts to complete their timecard, the first completed timecard can be used as a template for their timecard entry. The second employee then reviews and makes adjustments to their auto-generated template timecard. The system calculates a quality measure for the first timecard and its use as a template for subsequent timecards. As additional employees log into the system to enter their timecards, subsequent templates can be auto-populated by the latest best quality timecard template (i.e., the system will replace the template with the timecard that requires the least number of modifications/adjustments to it).

The system may have a predicted timecard template generated and ready for use for each individual for whom a timecard is required. Upon logging into the workforce management system to create a timecard, the individual can request the system to auto-populate his or her timecard with the system predicted timecard template.

According to further embodiments, the auto-generated predicted template can also be created based on historical information and patterns of timecards previously created. For example, the system can automatically analyze previous timecards to look for patterns that occur periodically. For example, the system can analyze whether certain timecard entries are captured on a daily, weekly, monthly, quarterly, yearly basis etc. for an individual. When these patterns are detected, these patterns can be used to predict a future timecard template for the individual. This is an example of a time-based pattern. Now this pattern may be the result of a certain shift that the individual works or could be due to seasonality of the business within the organization. By analyzing previous timecards the system can take these factors into account and predict when similar patterns may appear again for the individual in the future. Using these predictions, templates can be created to auto-populate timecards for future timecard periods.

The system can also analyze start times for an individual. For example if the individual has to capture his or her start time and end times for activities each day, that information may be extracted based on previous work patterns. For example, an individual may start work at 10 am on Mondays and 9 am on Tuesday to Friday. If this is a regular pattern for an individual, then that pattern can be used to predict the auto-generated timecard template for the current or next timecard period. Likewise, if the individual is working on a particular project or task code, then that pattern can be detected and used in the template for subsequent timecards.

One further advantage of a predictive timecard is that, when an individual fails to create a timecard by a given cut-off period (e.g., for payroll processing), entries can then be auto-generated for the individual for that timecard period and used in the organization's business processes. Adjustments and corrections can then be made at a later date to capture the actual times worked. Another advantage of using the auto-generated timecard is that hours worked and costs attributed based on predictive patterns and historical trends are more likely to be closer to the actual time worked by the individual than by using a standard missing timecard template in which one set of entries is used for all missing timecards. This may not be representative of the actual time worked. With this approach, any activities with an associated cost, for example, would be closer to the actual time rather than using a fixed standard "missing timecard template" for the organization.

Furthermore, the system may be able to predict not only start and stop times and hours worked, but also predict cost-centers against which the work is performed and/or any other attributes that are used to capture an individual's time (e.g., task, project code, assignment code etc). The timecard attributes can be predicted using statistical and probabilistic approaches.

The system can also take into account whether a particular predictive entry is still valid. For example, if a timecard is used to record time against a particular purchase order line or project code but that purchase order or project code is no longer active (i.e., the purchase order of project code has been closed since the last timecard period), then the system may automatically exclude that from the predictive timecard template.

When an individual completes a timecard the probability that that particular entry will appear in the next timecard period can be calculated based on historical timecards and also the correlation or variance between historical timecards. The system can capture this information for each entry within the timecard and use this information to inform the process that auto-generates subsequent predictive timecard templates.

For example, if an individual creates a timecard entry in the current timecard period that was also entered in the previous three timecard periods, then the probability that that entry will appear in the next timecard period is relatively high. Consequently, when the auto-generated template is created, the timecard entries with the highest probability of appearing in the template are created. The probability factors can be calculated for any attribute of the timecard.

Other factors can be taken into account to inform the predictive algorithms used in the system. For example, an employee's employment contract (contracted hours), type of work, role, assignment, organization, projects assigned to or worked on can all be used to inform the predictive timecard template. Also, current and future changes to, for example, overtime rules can also be taken into account. For example, if the organization has reduced the number of overtime hours on a particular project, that data can be used to limit any predictive overtime entry for the individual for the timecard template.

The predictive timecards can also be used to compare to the actual timecard entered by the individual to identify any unexpected patterns of timecard entry. The timecard entries (e.g., the total hours worked in a day, total hours worked in a week or timecard period, etc.) can be checked for variances against the predicted timecard. For example, if it is typical for an individual to normally enter timecards in which the total hours vary between 40-45 hours, then if on one timecard the individual enters 48 hours, the system can alert the individual or his or her manager (or timecard approver) that the entry differs from what is typically entered by the individual. This alert can help the individual or manager check whether the entry was indeed correct or is the result of incorrect data input at the time of entry. The variance or tolerance setting for triggering the alerts can be set at a system level, organizational level or individual level profile.

Aspects of the present invention described here automatically populate timecard data based on predictive approaches. This method and system have the ability to inform and "learn" from previous entries. One advantage of this approach is that it permits the auto-populated timecard to provide a more accurate prediction of the timecard entries compared to prior solutions to the entry of timecard data. This solution also permits the auto-population of timecard data to be "informed" from a broader set of criteria compared to prior solutions.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
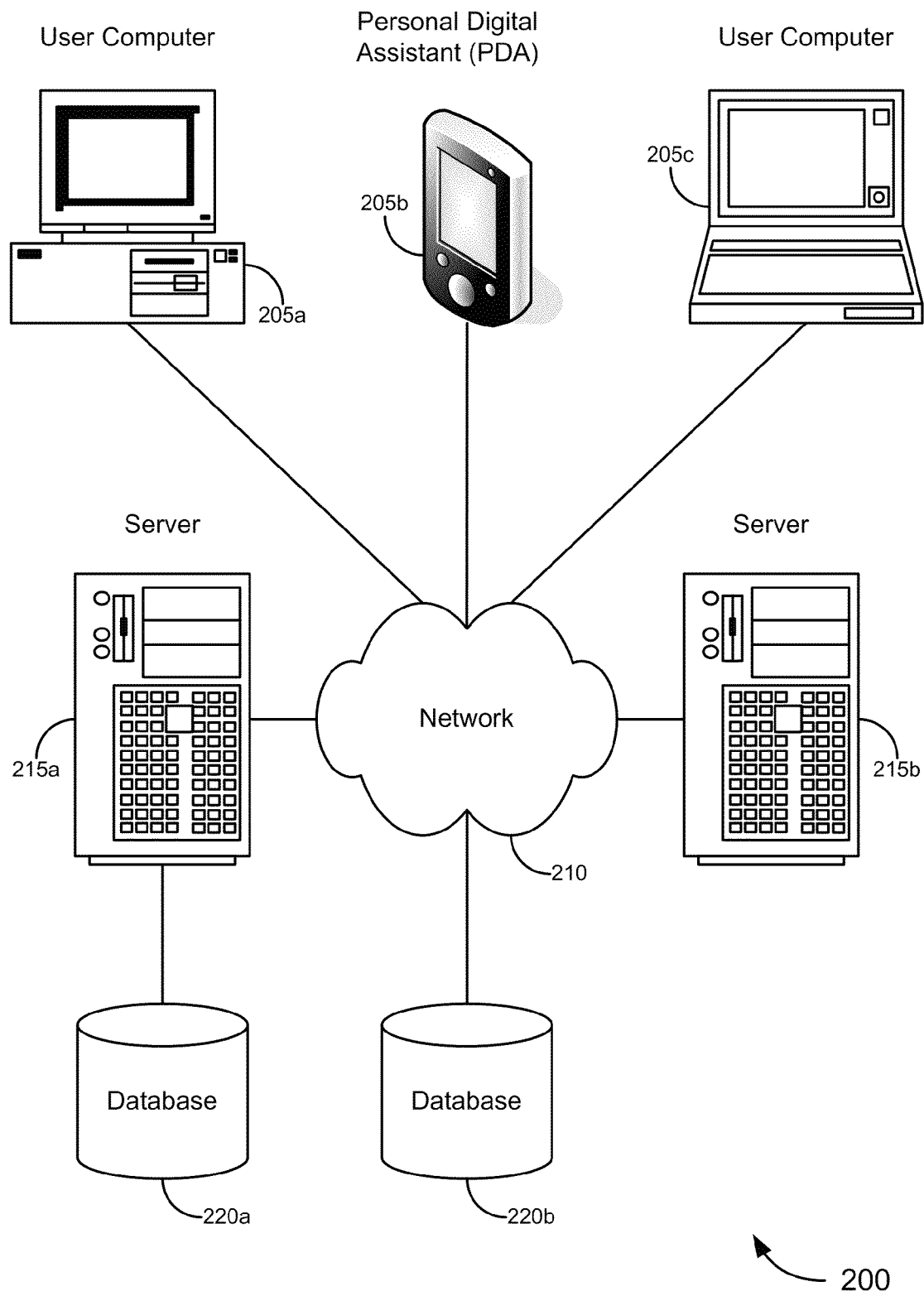
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
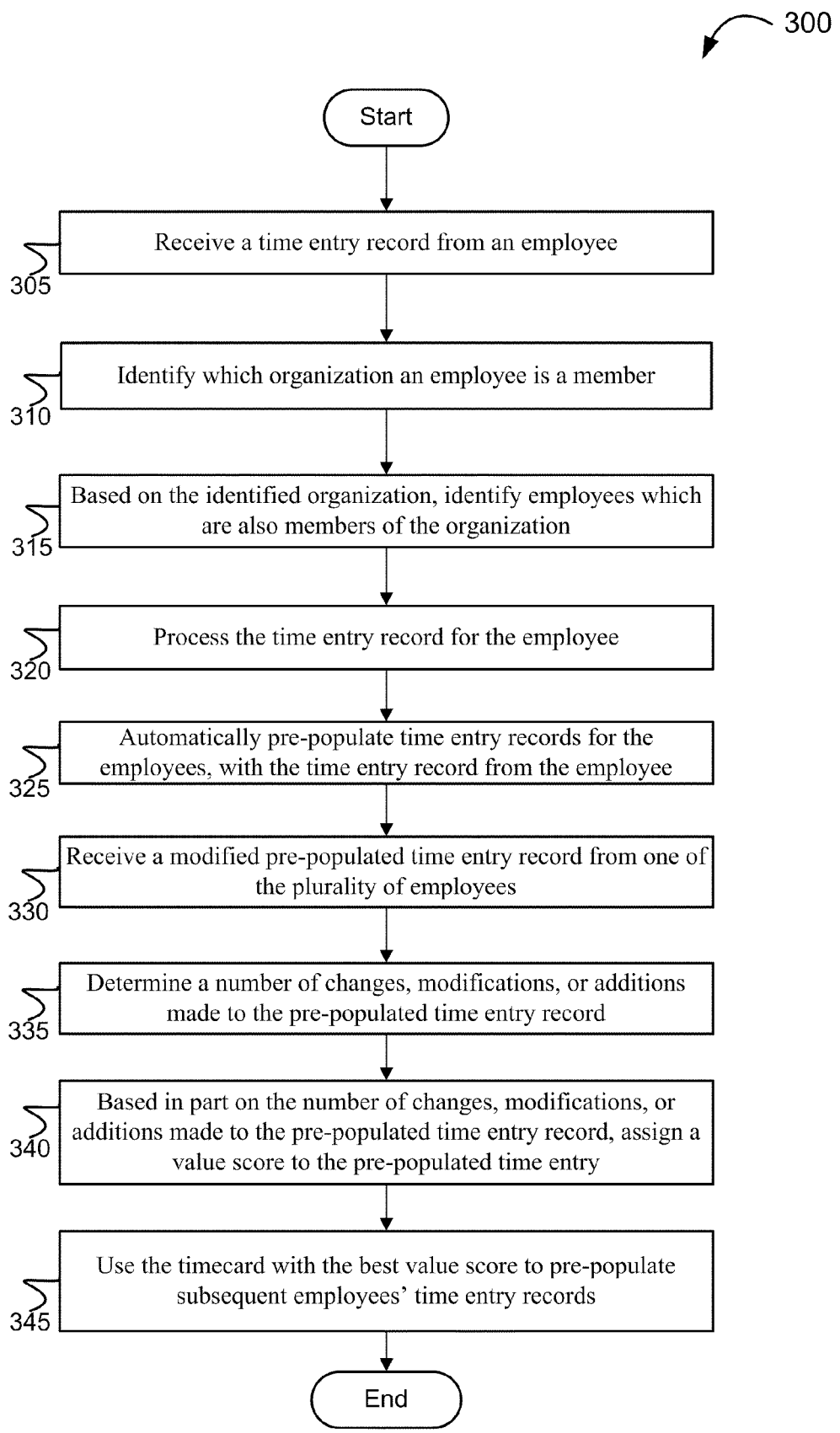
FIG. 3 is a flow diagram illustrating a method of implementing predictive time entry for workforce management systems, in accordance with one embodiment of the present invention.

Turning now to FIG. 3, which illustrates a method 300 of implementing predictive time entry for workforce management systems, in accordance with one embodiment of the present invention. At process block 305, a time entry record (or time card) may be received from an employee. The time entry record may include multiple time entries with associated time entry classifications. For example, the time entries may be classified as project-specific, group-specific, vacation, sick leave, personal time, meetings, training, etc. As such, in one embodiment, the time entry record may include a variety of activities and types of activities which designate the work performed by an employee for a given time period. In one embodiment, an employee may be any one of an independent contractor, a contract employ, a salaried employee, a part-time employee, etc.

At process block 310, the organization or group of which an employee is a member of may be determined. In one embodiment, the organization or group may include a team, a project, a department, a position designation, etc. Accordingly, based on the identified organization to which the employee belongs, other employees who belong to the same organization may also be indentified (process block 315). At process block 320, the time entry record for the first employee is processed, and based on that time entry record, a pre-populated time entry record is generated (i.e., a time entry record template) (process block 325).

At process block 330, modifications made to the template time entry record may be received. For example, as each of the subsequent employees enter their time entries into the template they will likely make modifications, changes, and other additions. Ideally, the template should be as close as possible to what the employees will actually be entering. Accordingly, a determination is made as to the number of changes, modifications, additions, etc. that are made to the template (process block 335).

According to one embodiment, based on the number of changes, modifications, and additions made to the template, a value (or accuracy) score may be assigned to the template (process block 340). The accuracy score may be based on the amount of changes made to the template, the significance of the changes, the number of additions, etc., or any combination thereof. Accordingly, the timecard with the best value score (e.g., the timecard requiring the least number of changes to the template) is used to pre-populate subsequent employees' time entry records (process block 345). Hence, the template provides the employees with the most accurate pre-populated time entry record.

Figure 4:
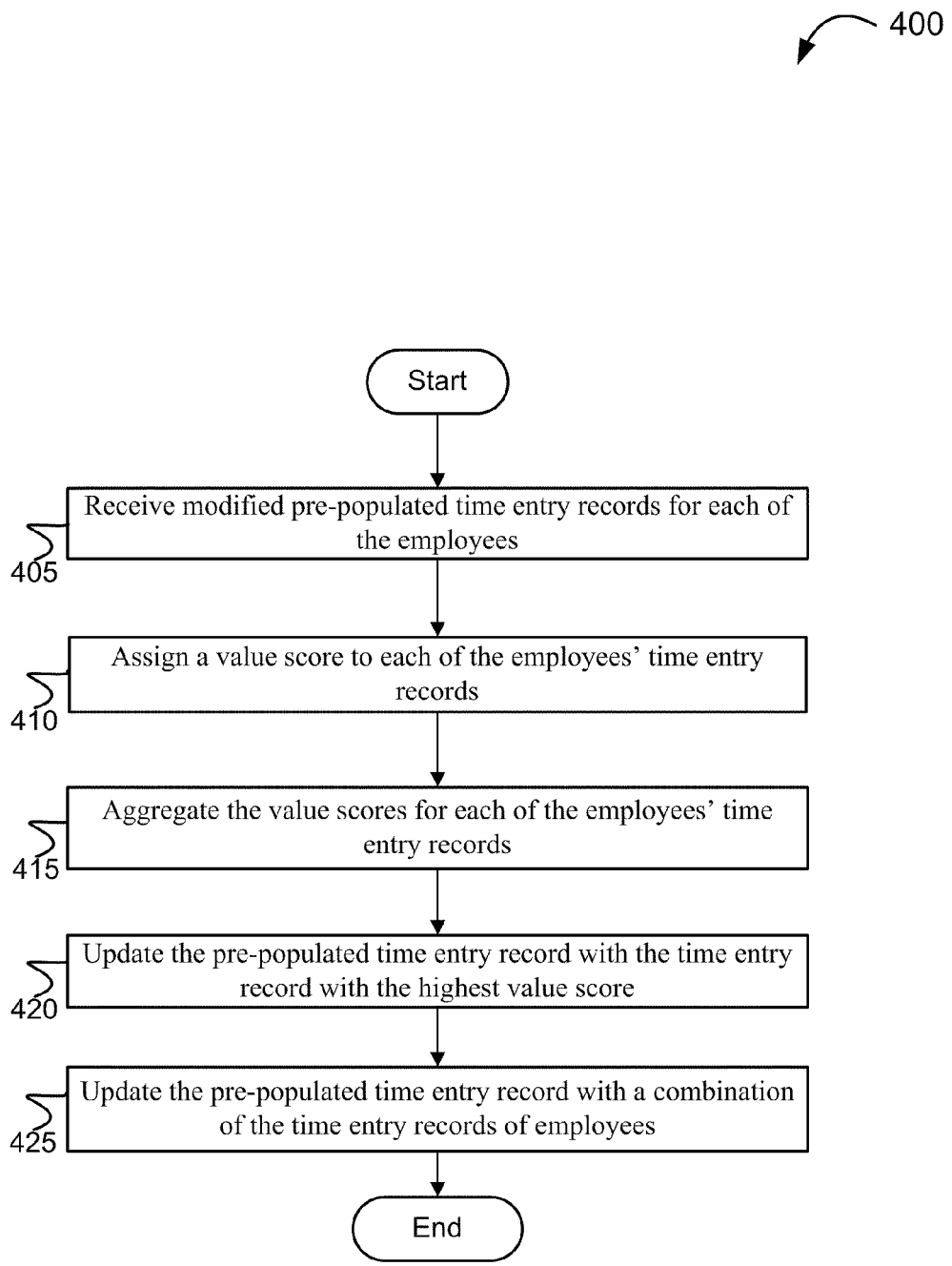
FIG. 4 is a flow diagram illustrating a method of implementing predictive time entry for workforce management systems, in accordance with another embodiment of the present invention.

Turning now to FIG. 4, which illustrates a method 400 of implementing predictive time entry for workforce management systems, in accordance with a further embodiment of the present invention. At process block 405, modified pre-populated time entry records for each of the employees in the organization may be received. A value score for each of the employees' time entry records may be assigned (process block 410). In one embodiment, the value scores associated with each of the employees' time record entry records may be aggregated to generate a combined score (process block 415).

At process block 420, the pre-populated time entry may be updated with the time entry record with the highest (or best) value score. Alternatively, at process block 425, the pre-populated time entry record may be updated to include some combination of the time entry records time entries. Accordingly, the pre-populated (template) time entry record would include the best entries from each of the employees' time entry records.

Figure 5:
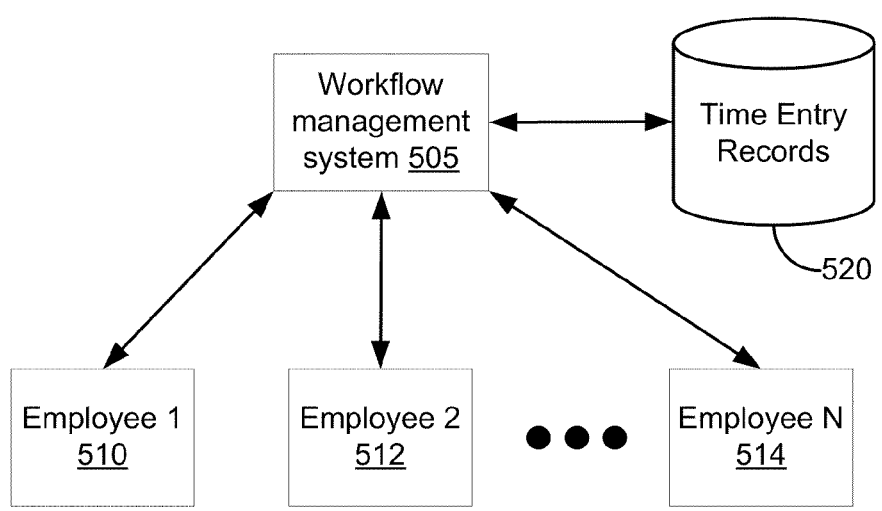
FIG. 5 is a block diagram illustrating a system for implementing predictive time entry for workforce management systems, in accordance with another embodiment of the present invention.

FIG. 5 illustrates a system 500 for implementing predictive time entry for workforce management systems. System 500 includes a workflow management system 505 in communication with a time entry record database 520. System 500 further includes employee system 1 510, employee system 2 512, and employee system N 514 in communication with workflow management system 505. In one embodiment, system 500 is configured to implement methods 300 and 400, as well as any other aspect of the present invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing predictive time entry for workforce management systems, the method comprising:
    receiving, by a workforce management system, a time card with time entries that were populated by an employee;
    processing, at the workforce management system, the time card for the employee to generate a time card template;
    identifying, by the workforce management system, an organization of which the employee is a member;
    identifying, by the workforce management system, a plurality of employees who are also members of the organization;
    automatically pre-populating, by the workforce management system, a plurality of time cards for the plurality of employees using the time card template and resulting in a plurality of pre-populated time cards;
    providing the plurality of pre-populated time cards to the plurality of employees for completion;
    receiving, by the workforce management system, modifications to one or more of the plurality of pre-populated time cards, wherein the modifications are made by one or more of the plurality of employees during completion;
    filtering, by the workforce management system, modifications that are specific to the one or more of the plurality of employees and that do not apply to all of the plurality of employees to generate filtered modifications;
    updating, by the workforce management system, the time card template based at least in part on the filtered modifications to create an updated time card template; and
    updating, by the workforce management system, ones of the plurality of pre-populated time cards that have not yet been completed, wherein the ones of the plurality of pre-populated time cards are updated based at least in part on the updated time card template.

2. The method of implementing predictive time entry for workforce management systems as in claim 1, further comprising receiving modified pre-populated time cards for each of the plurality of employees.

3. The method of implementing predictive time entry for workforce management systems as in claim 2, further comprising assigning a value score to each of the plurality of employees' time cards.

4. The method of implementing predictive time entry for workforce management systems as in claim 3, aggregating the value scores for each of the plurality of employees' time cards.

5. The method of implementing predictive time entry for workforce management systems as in claim 4, further comprising updating the time card template with the time card with the highest value score.

6. The method of implementing predictive time entry for workforce management systems as in claim 4, further comprising updating the time card template with a combination of the time cards of the plurality of employees.

7. The method of implementing predictive time entry for workforce management systems as in claim 1, wherein the employee comprises one or more of a contractor, a contract employee, a salaried employee, and an hourly employee.

8. The method of implementing predictive time entry for workforce management systems as in claim 1, further comprising:
continuing to receive modified time cards over time from the plurality of employees; and
based on the modified time cards, continuously updating the time card template.

9. The method of implementing predictive time entry for workforce management systems as in claim 1, further comprising:
utilizing historical data from previous time cards to determine patterns; and
using the determined patterns to further update the time card template.

10. The method of implementing predictive time entry for workforce management systems as in claim 9, wherein the determined patterns include one or more of the following: daily, weekly, monthly, quarterly, and annual patterns.

11. The method of implementing predictive time entry for workforce management systems as in claim 1, further comprising:
determining that at least one employee has failed to supply a time card by a predetermined time; and
in response, automatically using the time card template to populate the at least one employee's time card.

12. The method of implementing predictive time entry for workforce management systems as in claim 1, further comprising populating time card attributes in the time card template, wherein the attributes comprise one or more of the following: a task, a project code, and an assignment code.

13. A non-transitory machine-readable medium for implementing predictive time entry for workforce management systems, having sets of instructions which, when executed by a machine, cause the machine to:
receive a time card with time entries that were populated by an employee;
process the time card for the employee to generate a time card template;
identify an organization of which the employee is a member;
identify a plurality of employees who are also members of the organization;
automatically pre-populate a plurality of time cards for the plurality of employees using the time card template and resulting in a plurality of pre-populated time cards;
providing the plurality of pre-populated time cards to the plurality of employees for completion;
receive modifications to one or more of the plurality of pre-populated time cards, wherein the modifications are made by one or more of the plurality of employees during completion;
filter modifications that are specific to the one or more of the plurality of employees and that do not apply to all of the plurality of employees to generate filtered modifications;
update the pre-populated time card with the new pre-populated time;
update the time card template based at least in part on the filtered modifications to create an updated time card template; and
updating ones of the plurality of pre-populated time cards that have not yet been completed, wherein the ones of the plurality of pre-populated time cards are updated based at least in part on the updated time card template.

14. The non-transitory machine-readable medium for implementing predictive time entry for workforce management systems, as in claim 13, wherein the modifications that are specific to the one or more of the plurality of employees and that do not apply to all of the plurality of employees comprise one or more of the following: vacation time entries, sick leave time entries, and civil service time entries.

15. The non-transitory machine-readable medium for implementing predictive time entry for workforce management systems, as in claim 13, wherein the sets of instructions, when further executed by the machine, cause the machine to utilize time entries from time cards from at least one of the plurality of employees which correspond to the employee-specific time entries, to populate the time card template.

16. The non-transitory machine-readable medium for implementing predictive time entry for workforce management systems, as in claim 13, wherein the sets of instructions, when further executed by the machine, cause the machine to:
determine if a time entry in a time card is valid; and
in response to the time entry being invalid, removing the time entry from the time card.

17. The non-transitory machine-readable medium for implementing predictive time entry for workforce management systems, as in claim 13, wherein the sets of instructions, when further executed by the machine, cause the machine to utilize employment contract rules to determine time entries to place in the time card template, wherein the contract rules comprise one or more of the following: type of work, role, assignment, organization, contracted hours, overtime restrictions, and projects assigned to or worked on.

18. The non-transitory machine-readable medium for implementing predictive time entry for workforce management systems, as in claim 13, wherein the sets of instructions, when further executed by the machine, cause the machine to compare the time card template with an actual time card to determine unexpected patterns.

19. The non-transitory machine-readable medium for implementing predictive time entry for workforce management systems, as in claim 18, wherein the sets of instructions, when further executed by the machine, cause the machine to, in response to determining an unexpected pattern, report the pattern to the employer and/or manager of the employee.

20. The method of implementing predictive time entry for workforce management systems as in claim 1, further comprising:
monitoring changes, modifications, and/or updates to the new pre-populated time card; and
based on an amount of changes, modifications, and/or updates, generating a grade for the new pre-populated time card.

21. The method of implementing predictive time entry for workforce management systems as in claim 1, wherein the modifications that are specific to the one or more of the plurality of employees and that do not apply to all of the plurality of employees includes one or more of: a sick day entry, a vacation day entry, or a jury duty entry.

* * * * *

UNITED STATES PATENT AND TRADEMARK OFFICE
CERTIFICATE OF CORRECTION

PATENT NO. : 8,712,882 B2
APPLICATION NO. : 12/640799
DATED : April 29, 2014
INVENTOR(S) : Niazi Page 1 of 1

It is certified that error appears in the above-identified patent and that said Letters Patent is hereby corrected as shown below:

In the Specification

In column 1, line 28, delete "and or" and insert -- and/or --, therefor.

In column 5, line 55, delete "that that" and insert -- that --, therefor.

In column 5, line 64, delete "that that" and insert -- that --, therefor.

In column 10, line 61, delete "indentified" and insert -- identified --, therefor.

Signed and Sealed this
Seventh Day of October, 2014

Michelle K. Lee
*Deputy Director of the United States Patent and Trademark Office*